US010467596B2

(12) United States Patent
Kato

(10) Patent No.: US 10,467,596 B2
(45) Date of Patent: Nov. 5, 2019

(54) ELECTRONIC MAIL MONITORING

(71) Applicant: BIGLOBE Inc., Tokyo (JP)

(72) Inventor: Rihito Kato, Tokyo (JP)

(73) Assignee: BIGLOBE Inc. (JP)

(*) Notice: Subject to any disclaimer, the term of this patent is extended or adjusted under 35 U.S.C. 154(b) by 284 days.

(21) Appl. No.: 15/590,636

(22) Filed: May 9, 2017

(65) Prior Publication Data
US 2017/0255905 A1 Sep. 7, 2017

Related U.S. Application Data

(63) Continuation of application No. 14/425,476, filed as application No. PCT/JP2013/063010 on May 9, 2013, now abandoned.

(51) Int. Cl.
*G06F 15/16* (2006.01)
*G06Q 10/10* (2012.01)
(Continued)

(52) U.S. Cl.
CPC .......... *G06Q 10/107* (2013.01); *H04L 51/12* (2013.01); *H04L 51/20* (2013.01); *H04L 51/24* (2013.01);
(Continued)

(58) Field of Classification Search
CPC .......... H04L 51/34; H04L 51/12; H04L 51/24
(Continued)

(56) References Cited

U.S. PATENT DOCUMENTS 7,590,697 B2 9/2009 Ito et al.
9,092,761 B2 7/2015 Wieneke et al.
(Continued)

FOREIGN PATENT DOCUMENTS

| JP | 2006-115432 A | 4/2006 |
|---|---|---|
| JP | 2006-128917 A | 5/2006 |

(Continued)

OTHER PUBLICATIONS

International Search Report dated Aug. 13, 2013, cited by Japanese Patent Office, and which was cited in the international patent application PCT/JP2013/063010, filed May 9, 2013, to which this application claims priority (3 pages).
(Continued)

*Primary Examiner* — Wing F Chan
*Assistant Examiner* — Joseph R Maniwang
(74) *Attorney, Agent, or Firm* — Mark Malek; Daniel C. Pierron; Widerman Malek PL

(57) ABSTRACT

An electronic mail monitoring apparatus executes a plurality of processing. When the verification processing has judged that the uniqueness number of information for each of the user identification information calculated by the calculation processing has exceeded a first threshold, the calculation processing calculates a uniqueness number of countries or regions on the basis of the identification information for each user identification information extracted by the extraction processing within a unit time. The verification processing judges whether the uniqueness number of countries or regions for each of the user identification information calculated by the calculation processing has exceeded a predetermined second threshold. When the verification processing has judged that the uniqueness number of countries or regions for each of the user identification information calculated by the calculation processing has exceeded the second threshold, performs predetermined second notification to the notification destination.

7 Claims, 12 Drawing Sheets

(51) Int. Cl.
*H04L 12/58* (2006.01)
*H04L 29/06* (2006.01)
*H04L 29/08* (2006.01)

(52) U.S. Cl.
CPC .......... *H04L 51/34* (2013.01); *H04L 63/1425* (2013.01); *H04L 63/1441* (2013.01); *H04L 67/22* (2013.01); *H04L 67/306* (2013.01)

(58) Field of Classification Search
USPC ....................................................... 709/206
See application file for complete search history.

(56) References Cited

U.S. PATENT DOCUMENTS

| | | |
|---|---|---|
| 2005/0188036 A1 | 8/2005 | Yadusa |
| 2006/0259558 A1 | 11/2006 | Yen |
| 2011/0252043 A1 | 11/2011 | Webb-Johnson |

FOREIGN PATENT DOCUMENTS

| | | |
|---|---|---|
| JP | 2006-310902 A | 11/2006 |
| JP | 2007-266947 A | 10/2007 |
| JP | 2009-512082 A | 3/2009 |
| JP | 2010-191693 A | 9/2010 |

OTHER PUBLICATIONS

S. Abu-Nimeh et al., Proliferation and Detection of Blog Spam, Security & Privacy, IEEE Computer and Reliability Societies, vol. 8, Issue 5, Oct. 2010, p. 42-47 (6 pages).

Katsumura, Yukihiro, Yori Anzen na Pasokon Life no Tameni Security Site Katsuyojutsu Heder Joho kara Giso o Miyaburu, Nikkei Personal Computing, No. 544, Dec. 24, 2007, pp. 64 and 65 (English translation) (4 pages).

USPTO Office action dated Nov. 7, 2016 in related U.S. Appl. No. 14/425,476, filed Mar. 3, 2015 (19 pages).

F I G. 2
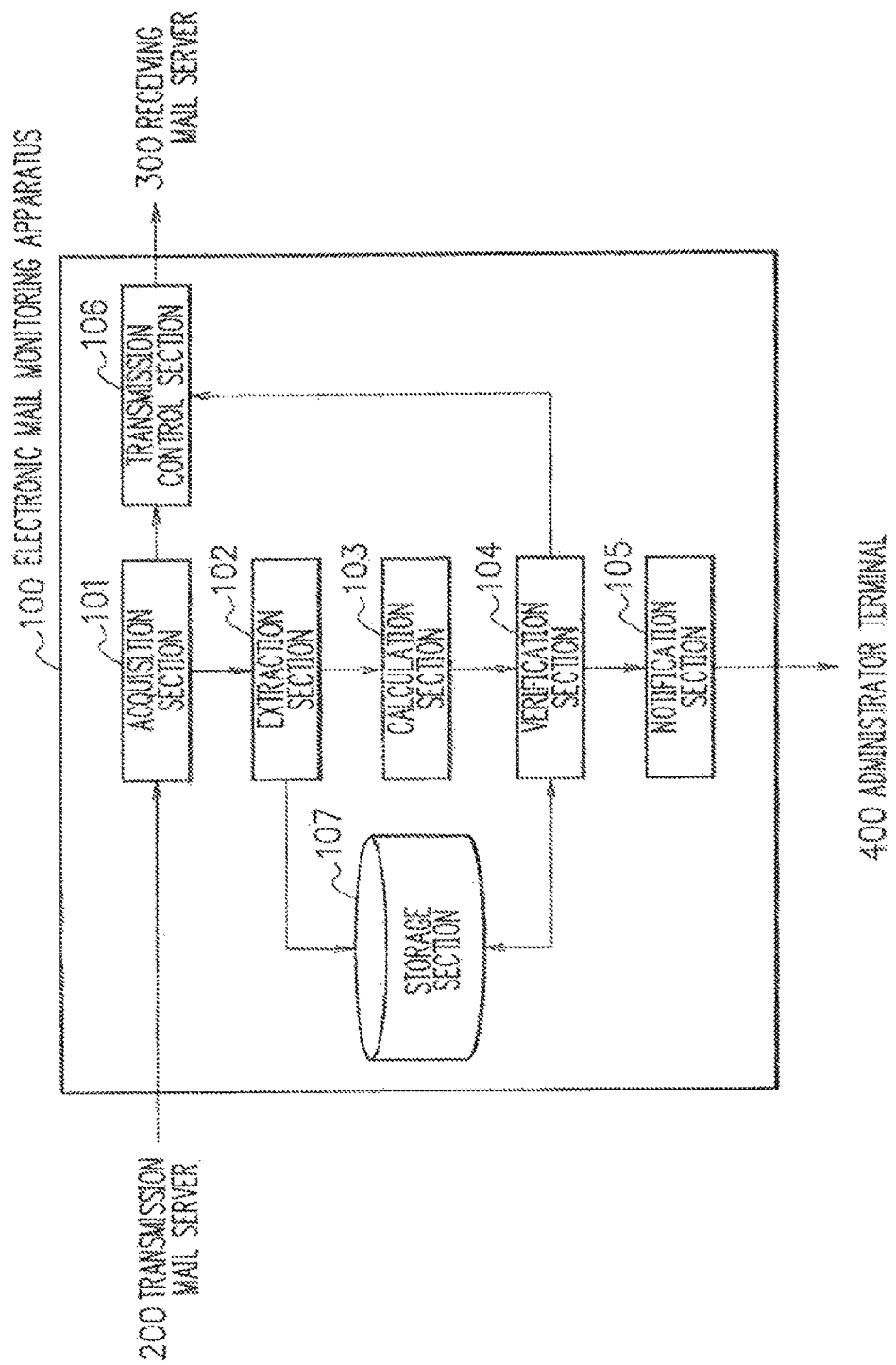

F I G. 3

| TRANSMISSION SOURCE MAIL ADDRESS | TRANSMISSION SOURCE IP ADDRESS | DATE AND TIME INFORMATION | NUMBER OF DESTINATIONS |
|---|---|---|---|
| aaa@mail.*.jp | 133.*.***.010 | 2012/07/01 10:01:30 | |
| bbb@mail.*.jp | 133.*.***.018 | 2012/07/01 10:01:30 | |
| aaa@mail.*.jp | 134.*.***.024 | 2012/07/01 10:01:29 | |
| aaa@mail.*.jp | 133.*.***.012 | 2012/07/01 10:01:28 | |
| aaa@mail.*.jp | 134.*.***.023 | 2012/07/01 10:01:26 | |
| bbb@mail.*.jp | 133.*.***.014 | 2012/07/01 10:01:25 | |
| ... | ... | ... | ... |

F I G. 4

| MEMBER ID | TRANSMISSION SOURCE IP ADDRESS | DATE AND TIME INFORMATION | NUMBER OF DESTINATIONS |
|---|---|---|---|
| K000001 | 133.*.*.010 | 2012/07/01 10:01:30 | |
| K000002 | 133.*.*.018 | 2012/07/01 10:01:30 | |
| K000001 | 134.*.*.024 | 2012/07/01 10:01:29 | |
| K000001 | 133.*.*.012 | 2012/07/01 10:01:28 | |
| K000001 | 134.*.*.023 | 2012/07/01 10:01:26 | |
| K000002 | 133.*.*.014 | 2012/07/01 10:01:25 | |
| ... | ... | ... | ... |

F I G. 6

| RANGE OF IP ADDRESS | COUNTRY IDENTIFIER |
|---|---|
| ... | ... |
| 133.*.*.*~133.*.*.* | JP |
| 134.*.*.*~134.*.*.* | DE |
| 135.*.*.*~138.*.*.* | US |
| 139.*.*.*~139.*.*.* | DE |
| ... | ... |

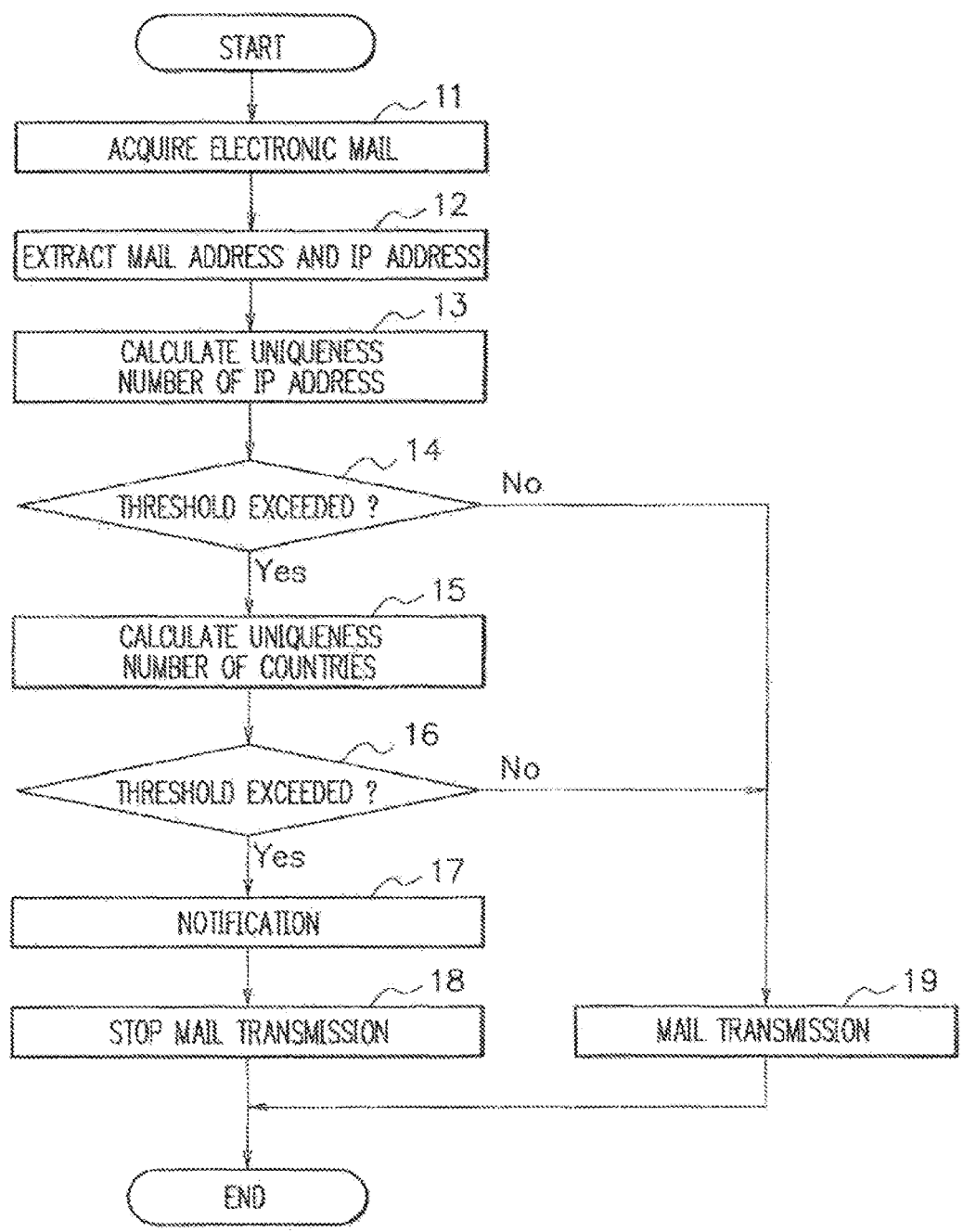
F I G. 7

F I G. 10

| MAIL ADDRESS | MEMBER ID | PASSWORD |
|---|---|---|
| aaa@mail.***jp | K000001 | ****** |
| bbb@mail.***jp | K000002 | ****** |
| ccc@mail.***jp | K000003 | ****** |
| ddd@mail.***jp | K000004 | ****** |
| *** | *** | *** |

ELECTRONIC MAIL MONITORING

RELATED APPLICATIONS

This application is a continuation application and claims the benefit under 35 U.S.C. § 120 of U.S. patent application Ser. No. 14/425,476 filed on Mar. 3, 2015 and titled ELECTRIC MAIL MONITORING, which is a national stage application under 35 U.S.C. § 371 of PCT patent application PCT/JP2013/063010, filed on May 9, 2013, which, in turn, claims the benefit of JP 2012-193748 filed on Sep. 4, 2012, the entire contents of each of which are incorporated herein by reference.

FIELD OF THE INVENTION

The present invention relates to an electronic mail monitoring apparatus, a transmission mail server, an electronic mail monitoring method, and a program for monitoring transmitted electronic mails. Specifically, the present invention relates to a system and method for more accurately detecting the transmission of junk mails.

BACKGROUND

In recent years, the act of using an electronic mail address of another person from an evil intention so as to spoof the person of transmission (sending) of an electronic mail and thereby transmitting so-called junk mails is causing problems. In many cases, junk mails are transmitted in a large number. This causes a possibility of occurrence of a busy state in the communication line.

In order to reduce transmission of such junk mails, a technique of restricting the number of mails that can be transmitted from the same electronic mail address per day is considered (for example, see Japanese Patent Publication No. 2006-128917). By virtue of this, transmission of junk mails transmitted in a large number can be suppressed.

Nevertheless, such a technique described in Japanese Patent Publication No. 2006-128917 has a problem that transmission of electronic mails transmitted in a large number is suppressed even when they are transmitted by an authorized user.

An object of the present invention is to provide an electronic mail monitoring apparatus, a transmission mail server, an electronic mail monitoring method, and a program for resolving the above-mentioned problem.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an electronic mail monitoring apparatus including:

an acquisition section for acquiring electronic mails transmitted from communication terminals;

an extraction section for, from the electronic mail acquired by the acquisition section, extracting user identification information indicating a user having transmitted the electronic mail and communication terminal identification information imparted to the communication terminal having transmitted the electronic mail;

a calculation section for, for each user identification information extracted by the extraction section within a unit time, calculating a uniqueness number of the communication terminal identification information;

a verification section for judging whether the uniqueness number of communication terminal identification information for each of the user identification information calculated by the calculation section has exceeded a predetermined first threshold; and a notification section for, when the verification section has judged that the uniqueness number of communication terminal identification information for each of the user identification information calculated by the calculation section has exceeded the first threshold, performing predetermined first notification to a notification destination set up in advance.

Further, the electronic mail monitoring apparatus of the present invention includes:

an acquisition section for acquiring electronic mails transmitted from communication terminals;

an extraction section for, from the electronic mail acquired by the acquisition section, extracting user identification information indicating a user having transmitted the electronic mail and communication terminal identification information imparted to the communication terminal having transmitted the electronic mail;

a calculation section for calculating a uniqueness number of countries or regions corresponding to the communication terminal identification information for each user identification information extracted by the extraction section within a unit time;

a verification section for judging whether the uniqueness number of countries or regions for each of the user identification information calculated by the calculation section has exceeded a predetermined second threshold; and a notification section for, when the verification section has judged that the uniqueness number of countries or regions for each of the user identification information calculated by the calculation section has exceeded the second threshold, performing predetermined second notification to a notification destination set up in advance.

Further, the transmission mail server of the present invention includes:

an authentication section for authenticating a user;

a storage section for storing authentication information used for the authentication;

an acquisition section for, when the authentication section has succeeded in authentication of the user by using the authentication information stored in the storage section, acquiring electronic mails transmitted from communication terminals;

an extraction section for extracting user identification information indicating the user having transmitted the electronic mail, from the authentication information and then extracting communication terminal identification information imparted to the communication terminal having transmitted the electronic mail, from the electronic mail acquired by the acquisition section or connection processing with the communication terminal;

a calculation section for, for each user identification information extracted by the extraction section within a unit time, calculating a uniqueness number of the communication terminal identification information;

a verification section for judging whether the uniqueness number of communication terminal identification information for each of the user identification information calculated by the calculation section has exceeded a predetermined first threshold; and a notification section for, when the verification section has judged that the uniqueness number of communication terminal identification information for each of the user identification information calculated by the calculation section has exceeded the first threshold, performing predetermined first notification to a notification destination set up in advance.

Further, the transmission mail server of the present invention includes:

an authentication section for authenticating a user;

a storage section for storing authentication information used for the authentication;

an acquisition section for, when the authentication section has succeeded in authentication of the user by using the authentication information stored in the storage section, acquiring electronic mails transmitted from communication terminals;

an extraction section for extracting user identification information indicating the user having transmitted the electronic mail, from the authentication information and then extracting communication terminal identification information imparted to the communication terminal having transmitted the electronic mail, from the electronic mail acquired by the acquisition section or connection processing with the communication terminal;

a calculation section for calculating a uniqueness number of countries or regions corresponding to the communication terminal identification information for each user identification information extracted by the extraction section within a unit time;

a verification section for judging whether the uniqueness number of countries or regions for each of the user identification information calculated by the calculation section has exceeded a predetermined second threshold; and a notification section for, when the verification section has judged that the uniqueness number of countries or regions for each of the user identification information calculated by the calculation section has exceeded the second threshold, performing predetermined second notification to a notification destination set up in advance.

Further, the electronic mail monitoring method of the present invention is an electronic mail monitoring method of monitoring electronic mails transmitted from communication terminals, performing:

the processing of acquiring electronic mails transmitted from the communication terminals;

the processing of, from the acquired electronic mail, extracting user identification information indicating a user having transmitted the electronic mail and communication terminal identification information imparted to the communication terminal having transmitted the electronic mail;

the processing of, for each of the user identification information extracted within a unit time, calculating a uniqueness number of the communication terminal identification information;

the processing of judging whether the uniqueness number of communication terminal identification information for each of the calculated user identification information has exceeded a predetermined first threshold; and the processing of, when it has been judged that the uniqueness number of communication terminal identification information for each of the calculated user identification information has exceeded the first threshold, performing predetermined first notification to a notification destination set up in advance.

Further, the electronic mail monitoring method of the present invention is an electronic mail monitoring method of monitoring electronic mails transmitted from communication terminals, performing:

the processing of acquiring electronic mails transmitted from the communication terminals;

the processing of, from the acquired electronic mail, extracting user identification information indicating a user having transmitted the electronic mail and communication terminal identification information imparted to the communication terminal having transmitted the electronic mail;

the processing of calculating a uniqueness number of countries or regions corresponding to the communication terminal identification information for each user identification information extracted within a unit time;

the processing of judging whether the uniqueness number of countries or regions for each of the calculated user identification information has exceeded a predetermined second threshold; and the processing of, when it has been judged that the uniqueness number of countries or regions for each of the calculated user identification information has exceeded the second threshold, performing predetermined second notification to a notification destination set up in advance.

Further, the program of the present invention is a program for causing a computer to execute:

the procedure of acquiring electronic mails transmitted from communication terminals;

the procedure of, from the acquired electronic mail, extracting user identification information indicating a user having transmitted the electronic mail and communication terminal identification information imparted to the communication terminal having transmitted the electronic mail;

the procedure of, for each of the user identification information extracted within a unit time, calculating a uniqueness number of the communication terminal identification information;

the procedure of judging whether the uniqueness number of communication terminal identification information for each of the calculated user identification information has exceeded a predetermined first threshold; and the procedure of, when it has been judged that the uniqueness number of communication terminal identification information for each of the calculated user identification information has exceeded the first threshold, performing predetermined first notification to a notification destination set up in advance.

Further, the program of the present invention is a program for causing a computer to execute:

the procedure of acquiring electronic mails transmitted from communication terminals;

the procedure of, from the acquired electronic mail, extracting user identification information indicating a user having transmitted the electronic mail and communication terminal identification information imparted to the communication terminal having transmitted the electronic mail;

the procedure of calculating a uniqueness number of countries or regions corresponding to the communication terminal identification information for each user identification information extracted within a unit time;

the procedure of judging whether the uniqueness number of countries or regions for each of the calculated user identification information has exceeded a predetermined second threshold; and the procedure of, when it has been judged that the uniqueness number of countries or regions for each of the calculated user identification information has exceeded the second threshold, performing predetermined second notification to a notification destination set up in advance.

BRIEF DESCRIPTION OF THE DRAWINGS

FIG. 2 is a diagram showing an example of internal configuration of an electronic mail monitoring apparatus shown in FIG. 1.

FIG. 3 is a diagram showing an example of correspondence stored in a storage section shown in FIG. 2.

FIG. 4 is a diagram showing another example of correspondence stored in a storage section shown in FIG. 2.

FIG. 6 is a diagram showing an example of country information stored in a storage section shown in FIG. 2.

FIG. 7 is a flow chart for describing an example of an electronic mail monitoring method employing country information in an electronic mail monitoring apparatus shown in FIG. 1.

FIG. 10 is a diagram showing an example of authentication information stored in a storage section shown in FIG. 9.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly Embodiments of the present invention are described below with reference to the drawings.

Figure 1:
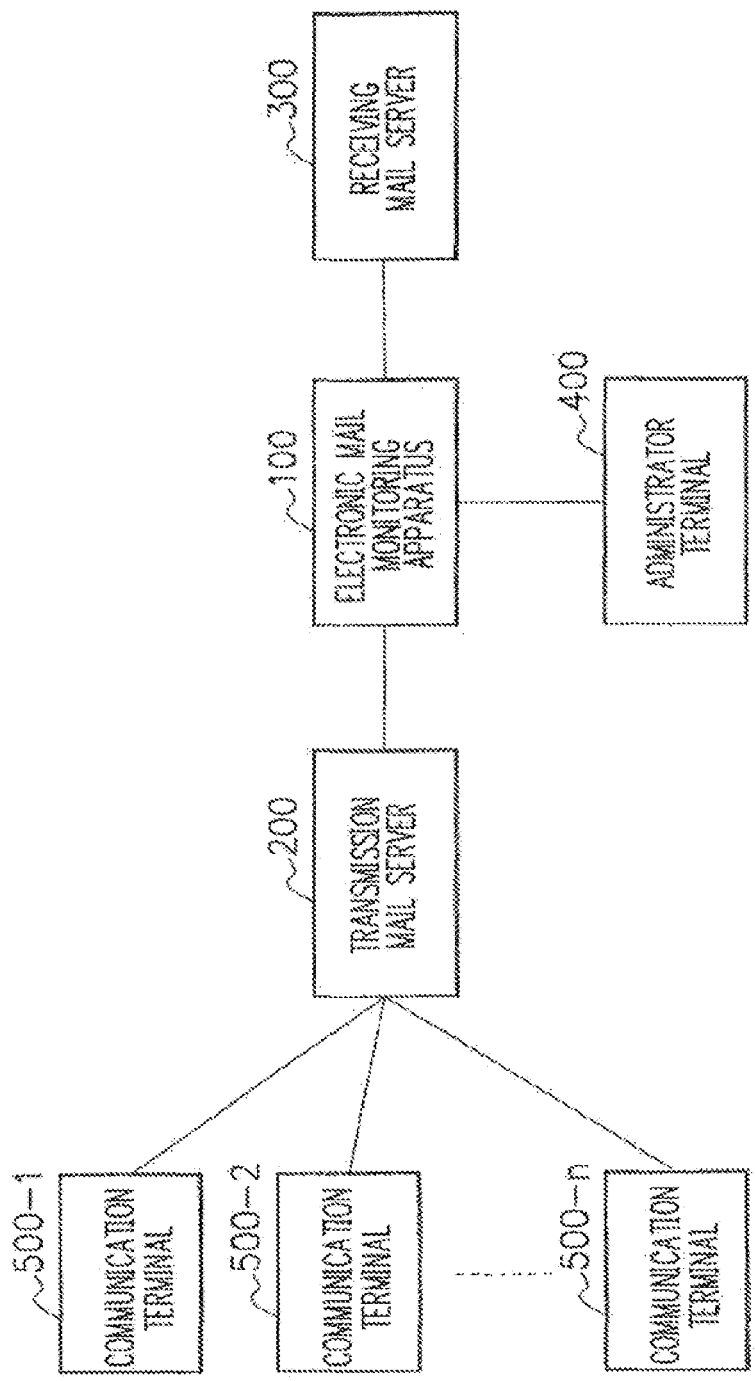
FIG. 1 is a diagram showing an embodiment of a communication system including an electronic mail monitoring apparatus of the present invention.

FIG. 1 is a diagram showing an embodiment of a communication system including an electronic mail monitoring apparatus of the present invention.

As shown in FIG. 1, the present mode is constructed from an electronic mail monitoring apparatus 100 of the present invention, a transmission mail server 200, a receiving mail server 300, an administrator terminal 400, and communication terminals 500-1 to 500-n (n is an integer).

The electronic mail monitoring apparatus 100 monitors electronic mails transmitted from the communication terminals 500-1 to 500-n.

FIG. 2 is a diagram showing an example of the internal configuration of the electronic mail monitoring apparatus 100 shown in FIG. 1.

As shown in FIG. 2, the electronic mail monitoring apparatus 100 shown in FIG. 1 is provided with an acquisition section 101, an extraction section 102, a calculation section 103, a verification section 104, a notification section 105, a transmission control section 106, and a storage section 107.

The acquisition section 101 acquires electronic mails transmitted from the communication terminals 500-1 to 500-n through the transmission mail server 200 to the receiving mail server 300.

From the electronic mail acquired by the acquisition section 101, the extraction section 102 extracts: user identification information such as the electronic mail address of transmission source indicating the user having transmitted the electronic mail; and communication terminal identification information such as the IP (Internet Protocol) address imparted to the communication terminal having transmitted the electronic mail. In general, these information pieces are contained in the header of the electronic mail acquired by the acquisition section 101. Further, the extraction section 102 writes the user identification information and the communication terminal identification information having been extracted, into the storage section 107 in correspondence to date and time information.

The calculation section 103 calculates the uniqueness number of IP addresses (the number of mutually different IP addresses) for each electronic mail address extracted by the extraction section 102. Here, the calculation section 103 calculates the uniqueness number of IP addresses of the electronic mails acquired by the acquisition section 101 within a unit time (e.g., 1 minute and 1 hour) set up in advance. Further, the calculation section 103 outputs the calculated uniqueness number of IP addresses to the verification section 104.

The verification section 104 compares the uniqueness number of IP addresses outputted from the calculation section 103 with a threshold (a first threshold) set up in advance. Further, as a result of comparison, the verification section 104 judges whether the uniqueness number of IP addresses has exceeded the first threshold. The first threshold is stored in the storage section 107. Further, the verification section 104 notifies the result of judgment to the notification section 105 and the transmission control section 106.

When the notification from the verification section 104 indicates that the uniqueness number of IP addresses has exceeded the first threshold, the notification section 105 performs predetermined notification (first notification) to the administrator terminal 400 serving as a notification destination set up in advance. This notification contains the mail address of the electronic mail whose uniqueness number of IP addresses has exceeded the first threshold. Further, the IP address and the date and time information thereof may also be contained.

When the notification from the verification section 104 indicates that the uniqueness number of IP addresses has exceeded the first threshold, the transmission control section 106 stops transmission of electronic mails having a transmission source equal to the mail address of the electronic mail whose uniqueness number of IP addresses has exceeded the first threshold. Further, when the notification from the verification section 104 indicates that the uniqueness number of IP addresses does not exceed the first threshold, the transmission control section 106 transmits electronic mails having a transmission source equal to the mail address of the electronic mail, to the receiving mail server 300.

Further, the storage section 107 stores the user identification information and the communication terminal identification information having been written in by the extraction section 102, in correspondence to the date and time information.

FIG. 3 is a diagram showing an example of correspondence stored in the storage section 107 shown in FIG. 2.

As shown in FIG. 3, the storage section 107 shown in FIG. 2 stores a mail address serving as the user identification information of the transmission source of the electronic mail, an IP address serving as the communication terminal identification information of the transmission source of the electronic mail, and date and time information in correspondence to each other. Further, the number of destinations of the electronic mail may also be in correspondence to the above-mentioned information. As shown in FIG. 3, some electronic mails transmitted from mutually the same mail address have mutually different IP addresses. Further, the date and time information indicates the date and time at which the transmission mail server 200 has received the electronic mail, the date and time at which the transmission mail server 200 has transmitted the electronic mail, the date and time at which the acquisition section 101 has acquired the electronic mail, the date and time at which the storage section 107 has stored the correspondence, or the like.

Further, the acquisition section 101 may acquire a member ID corresponding to the mail address from the transmission mail server 200 and then the storage section 107 may store the member ID, the IP address, and the date and time information in correspondence to each other.

FIG. 4 is a diagram showing another example of correspondence stored in the storage section 107 shown in FIG. 2.

As shown in FIG. 4, the storage section 107 shown in FIG. 2 stores a member ID serving as the user identification information of the transmission source of the electronic mail, an IP address serving as the communication terminal identification information of the transmission source of the electronic mail, and date and time information in correspondence to each other. Further, the number of destinations of the electronic mail may also be in correspondence to the above-mentioned information.

Here, the member ID may be one not acquired from the transmission mail server 200 by the acquisition section 101. For example, a member ID corresponding to the mail address may be registered in advance and then the member ID may be stored in the storage section 107 in correspondence to the mail address.

The transmission mail server 200 authenticates a user who uses the communication terminals 500-1 to 500-n having performed connection. At that time, the transmission mail server 200 authenticates the user by using authentication information consisting of an electronic mail address or a member ID (member identification information) of the user set up in advance and a password. Further, when having succeeded in authentication, the transmission mail server 200 transmits electronic mails transmitted from the communication terminals 500-1 to 500-n, to the electronic mail monitoring apparatus 100. Here, FIG. 1 shows an example that only one transmission mail server 200 is provided. However, a plurality may be provided.

The receiving mail server 300 transmits the electronic mail transmitted from the communication terminals 500-1 to 500-n through the transmission mail server 200 and the electronic mail monitoring apparatus 100, to a destination indicated by the destination information contained in the header of the electronic mail.

The administrator terminal 400 is a communication device operated by an administrator who administers the electronic mail monitoring apparatus 100. The administrator terminal 400 includes an output section such as a display and a speaker. This output section outputs a notification from the notification section 105. By virtue of this, the administrator can recognize the notification from the notification section 105.

The communication terminals 500-1 to 500-n are communication devices that are operated by users and thereby can transmit electronic mails. Further, the communication terminals 500-1 to 500-n are operated by an authorized user in some cases and, in other some cases, operated by a user having an evil intention of transmitting junk mails as described above.

An electronic mail monitoring method in the electronic mail monitoring apparatus 100 shown in FIG. 1 is described below.

Figure 5:
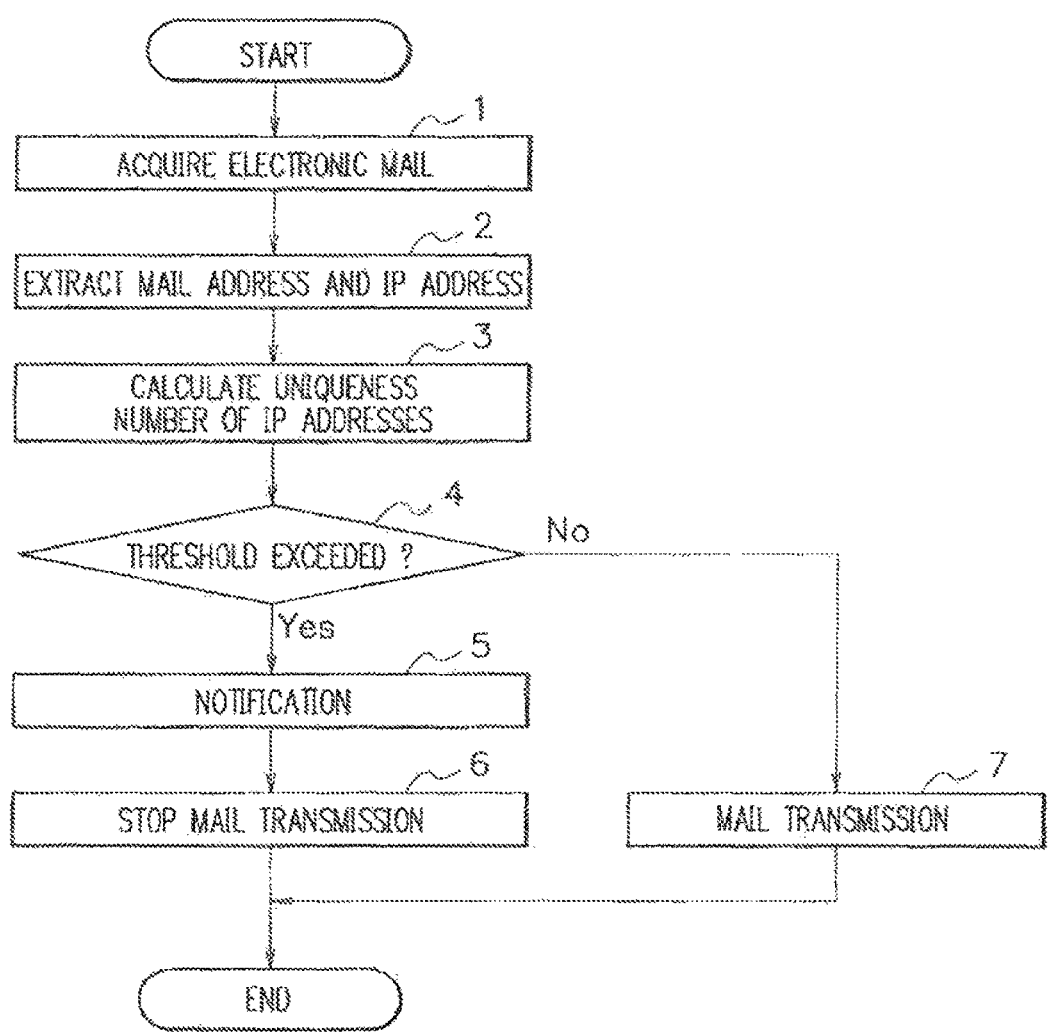
FIG. 5 is a flow chart for describing an example of an electronic mail monitoring method in an electronic mail monitoring apparatus shown in FIG. 1.

FIG. 5 is a flow chart for describing an example of an electronic mail monitoring method in the electronic mail monitoring apparatus 100 shown in FIG. 1.

First, when the electronic mail monitoring apparatus 100 receives through the transmission mail server 200 an electronic mail transmitted from the communication terminals 500-1 to 500-n, the acquisition section 101 at step 1 acquires the received electronic mail. Then, at step 2, the extraction section 102 extracts the mail address of transmission source and the IP address of transmission source from the electronic mail acquired by the acquisition section 101. The extraction section 102 writes the mail address and the IP address having been extracted, into the storage section 107 in correspondence to the date and time information.

At step 3, the calculation section 103 refers to the storage section 107 for each unit time and thereby calculates the uniqueness number of IP addresses extracted by the extraction section 102 within the unit time, for each mail address. Then, at step 4, the verification section 104 judges whether the uniqueness number of IP addresses for each mail address calculated by the calculation section 103 has exceeded a first threshold set up in advance.

For example, when the correspondence written into the storage section 107 by the extraction section 102 is premised to be as shown in FIG. 3 and the unit time is 5 seconds (in this example, 5 seconds from 10:01:25 to 10:01:30 on Jul. 1, 2012), the calculation section 103 calculates the uniqueness number of IP addresses for the mail address "aaa@mail.*.jp" as being "4". Further, the calculation section 103 calculates the uniqueness number of IP addresses for the mail address "bbb@mail.*.jp" as being "2". Then, when the first threshold is "3", the verification section 104 judges that the uniqueness number of IP addresses for the mail address "aaa@mail.*.jp" exceeds the first threshold. Further, the verification section 104 judges that the uniqueness number of IP addresses for the mail address "bbb@mail.*.jp" does not exceed the first threshold.

When the verification section 104 has judged that the uniqueness number of IP addresses for each mail address calculated by the calculation section 103 has exceeded the first threshold, the notification section 105 at step 5 performs notification (first notification) indicating a possibility that junk mails (spoofing mails) have been transmitted, to the administrator terminal 400 serving as the notification destination. This notification contains the mail address of the corresponding transmission source. Further, this notification may contain the IP address and the date and time information of the transmission source.

Further, when the verification section 104 has judged that the uniqueness number of IP addresses for each mail address calculated by the calculation section 103 has exceeded the first threshold, the transmission control section 106 at step 6 may stop transmission of electronic mails having been transmitted from the corresponding mail address. On the other hand, when the verification section 104 has judged that the uniqueness number of IP addresses for each mail address calculated by the calculation section 103 does not exceed the first threshold, the transmission control section 106 at step 7 performs transmission of electronic mails having been transmitted from the corresponding mail address.

In communication in which the communication terminals 500-1 to 500-n are fixed PCs (personal computers) or the like or, alternatively, in data communication performed such that the communication terminals 500-1 to 500-n perform connection (login) to the server by using the use member ID and the password, the IP addresses imparted to the communication terminals 500-1 to 500-n are semi-fixed. Thus, when a plurality of electronic mails have the same mail address of transmission source but have mutually different IP addresses, a high possibility is concluded that another person has maliciously used the mail address. Further, when the electronic mails have a high transmission frequency (the number of times of transmission within a unit time), a high possibility can be concluded that these electronic mails are junk mails (spoofing mails). The above-mentioned processing is performed by using these properties so that identification of junk mails (spoofing mails) can easily be achieved.

Further, in addition to a configuration that the judgment criterion for junk mails (spoofing mails) is the uniqueness number of IP addresses as described above, the country of transmission source may also be employed. In general, in the IP address, a usable range is determined for each country. That is, when predetermined bits of the IP address is referred to, the country where the IP address is used can be judged. The range of IP address and information (a country identifier) indicating the country in correspondence to each other may be stored in advance in the storage section 107 as country information and then, on the basis of the country information, the verification section 104 may judge a possibility that the transmitted electronic mails are junk mails (spoofing mails).

FIG. 6 is a diagram showing an example of the country information stored in the storage section 107 shown in FIG. 2.

As shown in FIG. 6, the storage section 107 shown in FIG. 2 stores a range of IP address and a country identifier in correspondence to each other. The range of IP address corresponding to each country is determined in advance for the world. Further, it is sufficient that the country identifier can identify the country. That is, a country code or the like set up in advance for each country may be employed.

An electronic mail monitoring method employing country information in the electronic mail monitoring apparatus 100 shown in FIG. 1 is described below.

FIG. 7 is a flow chart for describing an example of the electronic mail monitoring method employing country information in the electronic mail monitoring apparatus 100 shown in FIG. 1.

First, when the electronic mail monitoring apparatus 100 receives through the transmission mail server 200 an electronic mail transmitted from the communication terminals 500-1 to 500-n, the acquisition section 101 at step 11 acquires the received electronic mail. Then, at step 12, the extraction section 102 extracts the mail address of transmission source and the IP address of transmission source from the electronic mail acquired by the acquisition section 101. The extraction section 102 writes the mail address and the IP address having been extracted, into the storage section 107 in correspondence to the date and time information.

Then, at step 13, the calculation section 103 calculates the uniqueness number of IP addresses extracted by the extraction section 102 within the unit time, for each mail address. Then, at step 14, the verification section 104 judges whether the uniqueness number of IP addresses for each mail address calculated by the calculation section 103 has exceeded a first threshold set up in advance.

When the verification section 104 has judged that the uniqueness number of IP addresses for each mail address calculated by the calculation section 103 has exceeded the first threshold; the calculation section 103 at step 15 extracts the country information corresponding to the IP address on the basis of the IP address corresponding to the mail address extracted by the extraction section 102 within a unit time and the country information stored in the storage section 107, and then calculates the uniqueness number of countries of transmission source within a unit time, for each mail address. Then, at step 16, the verification section 104 judges whether the uniqueness number of countries for each mail address calculated by the calculation section 103 has exceeded a second threshold set up in advance.

When the verification section 104 has judged that the uniqueness number of countries for each mail address calculated by the calculation section 103 has exceeded the second threshold, the notification section 105 at step 17 performs notification (second notification) indicating a possibility that junk mails (spoofing mails) have been transmitted, to the administrator terminal 400 serving as the notification destination. This notification contains the mail address of the corresponding transmission source. Further, this notification may contain the IP address, the date and time information, and the country name of the transmission source.

For example, it is premised that the first threshold is "5" and the second threshold is "3". Then, a case is considered that the IP addresses of electronic mails transmitted from the mail address "aaa@mail.*.jp" within a unit time are two items of "133.*.*.010(JP)", one item of "133.*.*.012(JP)", one item of "134.* *.023 (DE)", one item of "134.*.*.024(DE)", two items of "135.*.*.009(US)", and one item of "139.*.*.123 (DE)". In this case, the uniqueness number of IP addresses is "6" and the uniqueness number of countries is "4". Thus, the notification section 105 performs notification. Further, a case is considered that the IP addresses of electronic mails transmitted from the mail address "aaa@mail.*.jp" within a unit time are two items of "133.*.*.014(JP)", one item of "133.*.*.018(JP)", two item of "133.*, *.015(JP)", one item of "133.*.*.024(JP)", two items of "133.*.*.033(JP)", and one item of "133.*.*.123(JP)". In this case, the uniqueness number of IP addresses is "6" and the uniqueness number of countries is "1". Thus, the notification section 105 does not perform notification.

Further, when the verification section 104 has judged that the uniqueness number of countries for each mail address calculated by the calculation section 103 has exceeded the second threshold, the transmission control section 106 at step 18 may stop transmission of electronic mails having been transmitted from the corresponding mail address.

On the other hand, when the verification section 104 has judged that the uniqueness number of IP addresses for each mail address calculated by the calculation section 103 does not exceed the first threshold or, alternatively, when the verification section 104 has judged that the uniqueness number of countries for each mail address calculated by the calculation section 103 does not exceed the second threshold, the transmission control section 106 at step 19 performs transmission of electronic mails having been transmitted from the corresponding mail address.

Here, after the processing of step 12, the processing may be such that: the extraction section 102 writes the mail address and the IP address having been extracted, into the storage section 107 in correspondence to the date and time information; then the processing of steps 13 and 14 are not performed; and then at step 15, on the basis of the IP address corresponding to the mail address extracted by the extraction section 102 within a unit time and the country information stored in the storage section 107, the calculation section 103 extracts the country information corresponding to the IP address and then calculates the uniqueness number of countries of transmission source within a unit time, for each mail address. By virtue of this, even when the uniqueness number of IP addresses of transmission source for each mail address does not exceed the first threshold, the verification section 104 can judge whether the uniqueness number of countries of transmission source for each mail address has exceeded the second threshold.

As such, in addition to the uniqueness number of IP addresses, the uniqueness number of countries is employed as the judgment criterion so that the identification accuracy for junk mails (spoofing mails) can be improved. That is, it is difficult to transmit electronic mails from a plurality of countries within a short time. Thus, when the unit time is set short and then the country of transmission source is judged on the basis of the range to which the IP address belongs, electronic mails transmitted from countries in a number greater than or equal to a predetermined number can be concluded as having a high possibility of junk mails (spoofing mails).

Here, the example given above has been described for a case that the mail address is employed as the user identification information. Instead, the user identification information may be the member ID acquired by the acquisition section 101 from the transmission mail server 200 with using the mail address as a key.

Further, as for the judgment criterion for junk mails (spoofing mails), in addition to the country of transmission source, the region may be employed in a case that the region (e.g., the Kanto district and the Asia region) of transmission source can be identified on the basis of the IP address of transmission source.

The function of the electronic mail monitoring apparatus 100 described above may be provided in the transmission mail server 200.

Figure 8:
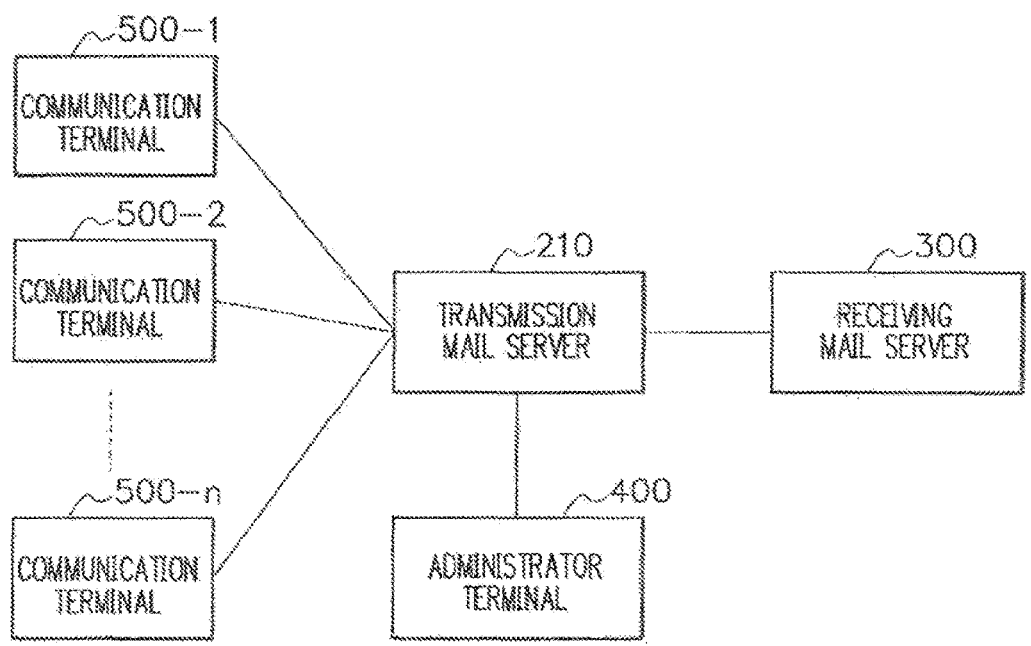
FIG. 8 is a diagram showing an embodiment of a communication system including a transmission mail server of the present invention.

FIG. 8 is a diagram showing an embodiment of a communication system including a transmission mail server of the present invention.

As shown in FIG. 8, the present mode is constructed from a transmission mail server 210 of the present invention, a receiving mail server 300, an administrator terminal 400, and communication terminals 500-1 to 500-n (n is an integer).

The receiving mail server 300, the administrator terminal 400 and the communication terminals 500-1 to 500-n are respectively the same as those shown in FIG. 1.

The transmission mail server 210 is a communication device having both of the function owned by the transmission mail server 200 shown in FIG. 1 and the function owned by the electronic mail monitoring apparatus 100.

Figure 9:
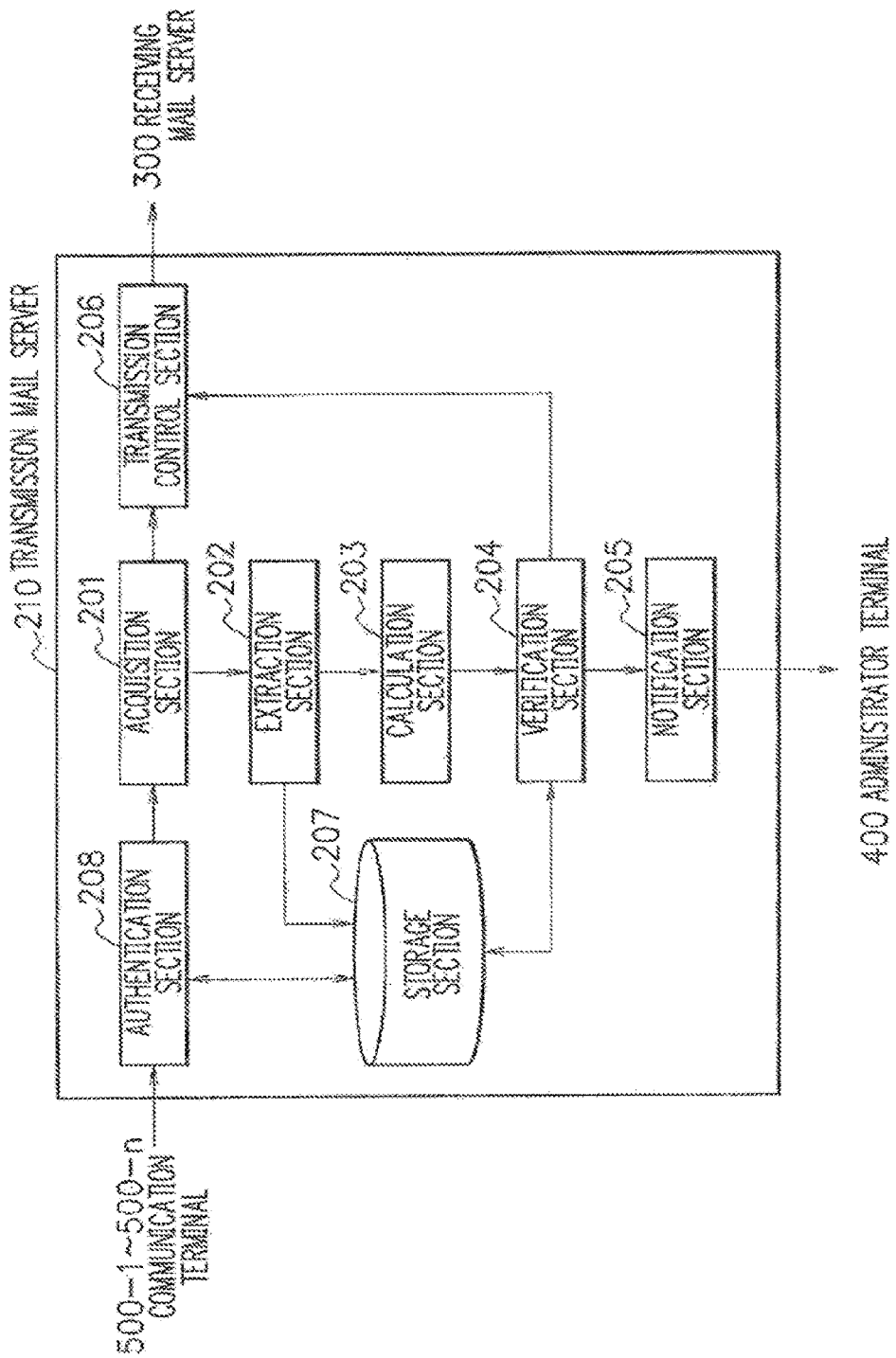
FIG. 9 is a diagram showing an example of internal configuration of a transmission mail server shown in FIG. 8.

FIG. 9 is a diagram showing an example of the internal configuration of the transmission mail server 210 shown in FIG. 8.

As shown in FIG. 9, the transmission mail server 210 shown in FIG. 8 is provided with an acquisition section 201, an extraction section 202, a calculation section 203, a verification section 204, a notification section 205, a transmission control section 206, a storage section 207, and an authentication section 208. Here, FIG. 9 shows an example of main components concerning the present embodiment among the components provided in the transmission mail server 210 shown in FIG. 8.

The extraction section 202 has the same function as the extraction section 102 shown in FIG. 2.

The calculation section 203 has the same function as the calculation section 103 shown in FIG. 2.

The verification section 204 has the same function as the verification section 104 shown in FIG. 2.

The notification section 205 has the same function as the notification section 105 shown in FIG. 2.

The transmission control section 206 has the same function as the transmission control section 106 shown in FIG. 2.

The authentication section 208 authenticates a user who operates the communication terminals 500-1 to 500-n. At that time, the authentication section 208 authenticates the user by comparing the authentication information transmitted from the communication terminals 500-1 to 500-n with the authentication information stored in the storage section 207. This authentication information is the user identification information such as the mail address and the member ID of the user and the password. Further, the detailed authentication method may be the same as general one.

In addition to the information stored in the storage section 107 shown in FIG. 2, the storage section 207 may store authentication information used for authenticating a user who operates the communication terminals 500-1 to 500-n.

FIG. 10 is a diagram showing an example of authentication information stored in the storage section 207 shown in FIG. 9.

As shown in FIG. 10, the storage section 207 shown in FIG. 9 stores the mail address, the member ID, and the password as the authentication information. These are stored in advance.

When the authentication section 208 has succeeded in authentication of a user by using the authentication information stored in the storage section 207, the acquisition section 201 acquires electronic mails transmitted from the communication terminals 500-1 to 500-n.

An electronic mail monitoring method in the transmission mail server 210 shown in FIG. 8 is described below.

Figure 11:
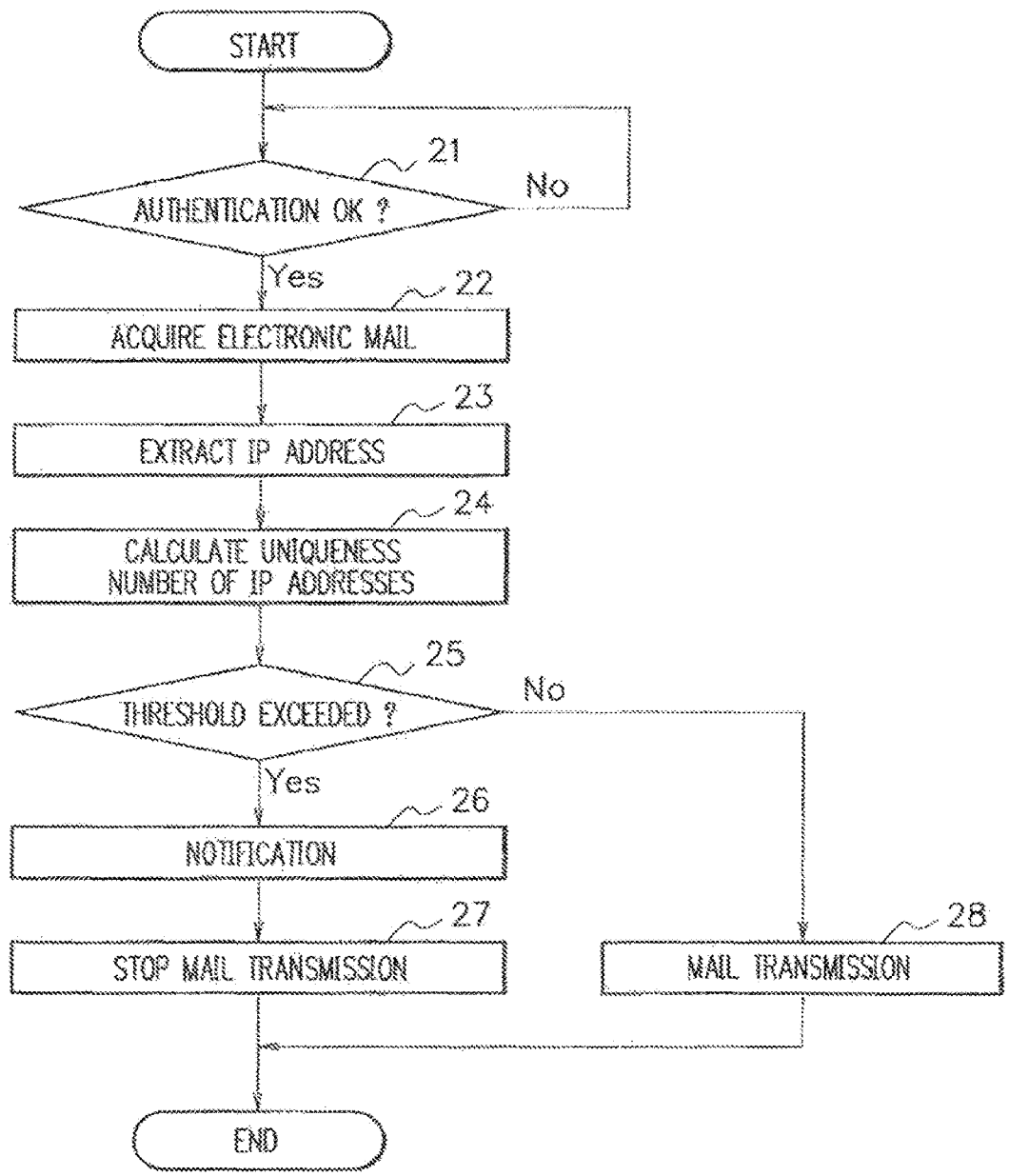
FIG. 11 is a flow chart for describing an example of an electronic mail monitoring method in a transmission mail server shown in FIG. 8.

FIG. 11 is a flow chart for describing an example of the electronic mail monitoring method in the transmission mail server 210 shown in FIG. 8.

First, when authentication information (a member ID or a mail address plus a password) has been transmitted from the communication terminals 500-1 to 500-n, the authentication section 208 at step 21 compares the transmitted authentication information with the authentication information stored in advance in the storage section 207 and thereby authenticates the user.

When the authentication section 208 has succeeded in the authentication, the electronic mail transmitted from the communication terminals 500-1 to 500-n is received by the transmission mail server 210. At step 22, the acquisition section 201 acquires the received electronic mail. Then, at step 23, the extraction section 202 extracts the IP address of transmission source from the electronic mail acquired by the acquisition section 201 or from connection processing (e.g., an SMTP session) with the communication terminals 500-1 to 500-n. The extraction section 202 writes the extracted IP address and the mail address or the member ID (the member ID is employed as an example in the following description) used for authentication by the authentication section 208, into the storage section 207 in correspondence to the date and time information (e.g., the correspondence shown in FIG. 4). This date and time information indicates the date and time at which the transmission mail server 210 has received the electronic mail, the date and time at which the transmission mail server 210 has transmitted the electronic mail, the date and time at which the acquisition section 201 has acquired the electronic mail, the date and time at which the storage section 207 has stored the correspondence, or the like.

Then, at step 24, the calculation section 203 calculates the uniqueness number of IP addresses extracted by the extraction section 202 within the unit time, for each member ID. Then, at step 25, the verification section 204 judges whether the uniqueness number of IP addresses for each member ID calculated by the calculation section 203 has exceeded a first threshold set up in advance.

When the verification section 204 has judged that the uniqueness number of IP addresses for each member ID calculated by the calculation section 203 has exceeded the first threshold, the notification section 205 at step 26 performs notification (first notification) indicating a possibility that junk mails (spoofing mails) have been transmitted, to the administrator terminal 400 serving as the notification destination. This notification contains the mail address of the corresponding transmission source. Further, this notification may contain the IP address and the date and time information of the transmission source.

Further, when the verification section 204 has judged that the uniqueness number of IP addresses for each member ID calculated by the calculation section 203 has exceeded the first threshold, the transmission control section 206 at step 27 may stop transmission of electronic mails having been transmitted from the mail address corresponding to the corresponding member ID. On the other hand, when the verification section 204 has judged that the uniqueness number of IP addresses for each member ID calculated by the calculation section 203 does not exceed the first threshold, the transmission control section 206 at step 28 performs transmission of electronic mails having been transmitted from the mail address corresponding to the corresponding member ID.

Further, similarly to the first embodiment, in addition to a configuration that the judgment criterion for junk mails (spoofing mails) is the uniqueness number of IP addresses, the country of transmission source may also be employed.

An electronic mail monitoring method employing country information in the transmission mail server 210 shown in FIG. 8 is described below.

Figure 12:
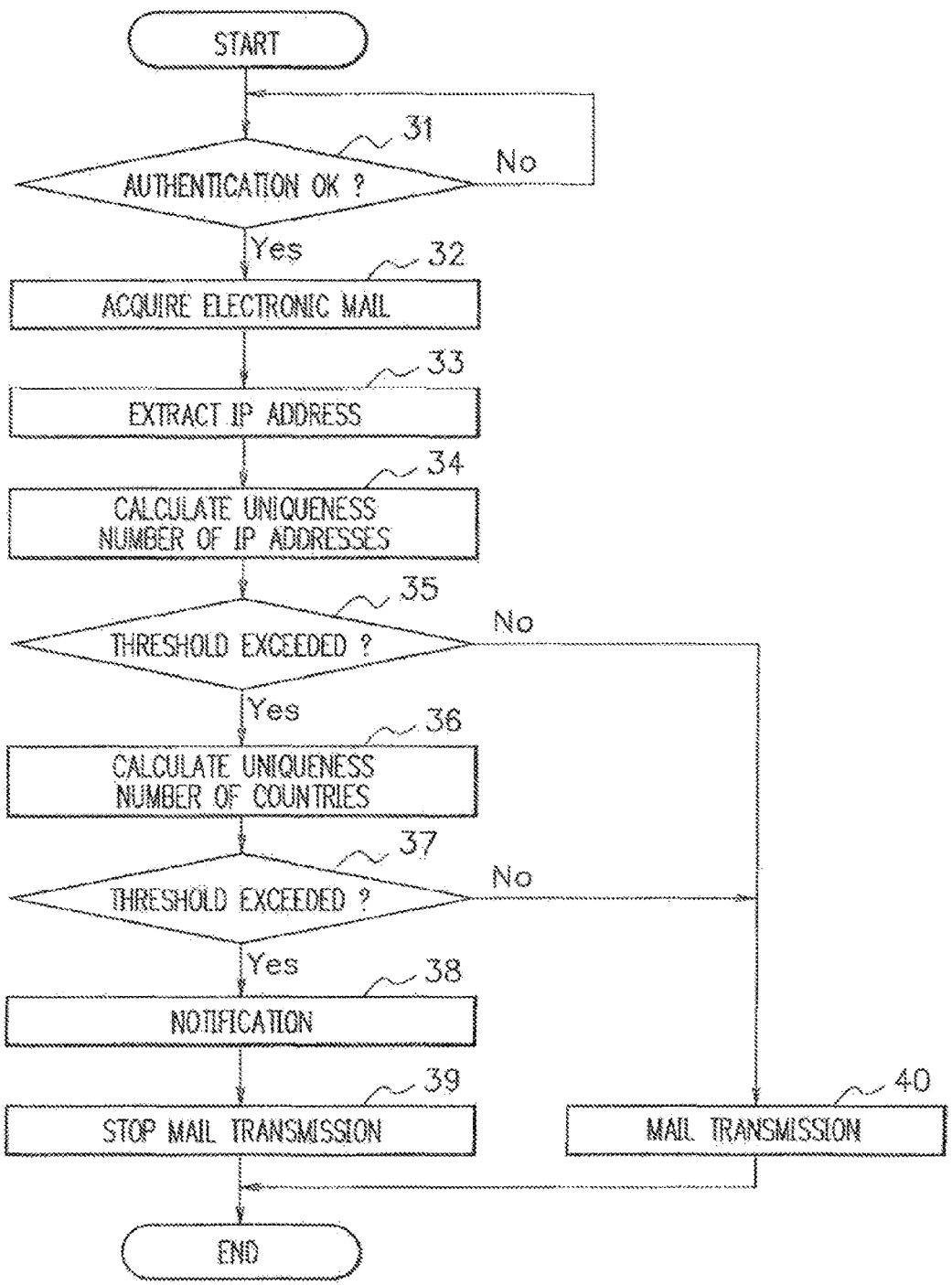
FIG. 12 is a flow chart for describing an example of an electronic mail monitoring method employing country information in a transmission mail server shown in FIG. 8.

FIG. 12 is a flow chart for describing an example of the electronic mail monitoring method employing country information in the transmission mail server 210 shown in FIG. 8.

First, when authentication information (a member ID or a mail address plus a password) has been transmitted from the communication terminals 500-1 to 500-n, the authentication section 208 at step 31 compares the transmitted authentication information with the authentication information stored in advance in the storage section 207 and thereby authenticates the user.

When the authentication section 208 has succeeded in the authentication, the electronic mail transmitted from the communication terminals 500-1 to 500-n is received by the transmission mail server 210. At step 32, the acquisition section 201 acquires the received electronic mail. Then, at step 33, the extraction section 202 extracts the IP address of transmission source from the electronic mail acquired by the acquisition section 201. The extraction section 202 writes the extracted IP address and the mail address or the member ID used for authentication by the authentication section 208, into the storage section 207 in correspondence to the date and time information. This date and time information is the same as that is written into the storage section 207 by the extraction section 202 after step 23.

Then, at step 34, the calculation section 203 calculates the uniqueness number of IP addresses extracted by the extraction section 202 within the unit time, for each member ID. Then, at step 35, the verification section 204 judges whether the uniqueness number of IP addresses for each member ID calculated by the calculation section 203 has exceeded a first threshold set up in advance.

When the verification section 204 has judged that the uniqueness number of IP addresses for each member ID calculated by the calculation section 203 has exceeded the first threshold, the calculation section 203 at step 36, on the basis of the IP address extracted by the extraction section 202 within a unit time and the country information stored in the storage section 207, extracts the country information corresponding to the IP address and then calculates the uniqueness number of countries of transmission source within a unit time, for each member ID. Then, at step 37, the verification section 204 judges whether the uniqueness number of countries for each member ID calculated by the calculation section 203 has exceeded a second threshold set up in advance.

When the verification section 204 has judged that the uniqueness number of countries for each member ID calculated by the calculation section 203 has exceeded the second threshold, the notification section 205 at step 38 performs notification (second notification) indicating a possibility that junk mails (spoofing mails) have been transmitted, to the administrator terminal 400 serving as the notification destination. This notification contains the mail address of transmission source corresponding to the corresponding member ID. Further, this notification may contain the IP address, the date and time information, and the country name of the transmission source.

Further, when the verification section 204 has judged that the uniqueness number of countries for each member ID calculated by the calculation section 203 has exceeded the second threshold, the transmission control section 206 at step 39 may stop transmission of electronic mails having been transmitted from the mail address corresponding to the corresponding member ID. On the other hand, when the verification section 204 has judged that the uniqueness number of countries for each member ID calculated by the calculation section 203 does not exceed the second threshold, the transmission control section 206 at step 40 performs transmission of electronic mails having been transmitted from the mail address corresponding to the corresponding member ID.

Here, after the processing of step 33, the processing may be such that: the extraction section 202 writes the extracted IP address and the member ID used for authentication, into the storage section 207 in correspondence to the date and time information; then the processing of steps 34 and 35 is not performed; and then at step 36, on the basis of the IP address extracted by the extraction section 202 within a unit time and the country information stored in the storage section 207, the calculation section 203 extracts the country information corresponding to the IP address and then calculates the uniqueness number of countries of transmission source within a unit time, for each member ID. By virtue of this, even when the uniqueness number of IP addresses of transmission source for each member ID does not exceed the first threshold, the verification section 204 can judge whether the uniqueness number of countries of transmission source for each member ID has exceeded the second threshold.

Further, similarly to the first embodiment, as for the judgment criterion for junk mails (spoofing mails), in addition to the country of transmission source, the region may be employed in a case that the region (e.g., the Kanto district and the Asia region) of transmission source can be identified on the basis of the IP address of transmission source.

As such, when the function of the electronic mail monitoring apparatus 100 in the first embodiment is imparted to the transmission mail server 210 in the second embodiment, an effect similar to that in the first embodiment can be obtained also in the second embodiment.

Here, in the embodiments given above, the processing of calculating the uniqueness number of IP addresses for each mail address or member ID and the processing of calculating the uniqueness number of countries or regions for each mail address or member ID may be performed for each predetermined unit time (periodically). Further, these processing pieces may be performed at each timing that the acquisition section 101 or 201 has acquired an electronic mail and then the extraction section 102 or 202 has extracted the IP address (at each time of receiving an electronic mail). In a case that these processing pieces are to be performed at each time of receiving an electronic mail, the uniqueness number of IP addresses or of countries or regions is calculated for the mail addresses (the member IDs) of the electronic mails having already been received within a predetermined time (e.g., 5 seconds) counted from the date and time of having received the electronic mail.

As described above, the processing performed by each component provided respectively in the electronic mail monitoring apparatus 100 and the transmission mail server 210 may be performed by a logic circuit fabricated in accordance with the individual object. Further, a computer program (referred to as a program, hereinafter) describing the contents of processing as a procedure may be recorded on a recording medium readable individually by the electronic mail monitoring apparatus 100 and the transmission mail server 210. Then, the program recorded on the recording medium may be read and executed individually by the electronic mail monitoring apparatus 100 and the transmission mail server 210. The recording medium readable individually by the electronic mail monitoring apparatus 100 and the transmission mail server 210 indicates a portable recording medium such as a floppy (registered trademark) disc, a magneto-optical disc, a DVD, and a CD as well as a memory such as a ROM and a RAM and an HDD built individually in the electronic mail monitoring apparatus 100 and the transmission mail server 210. The program recorded on the recording medium is read by a CPU (not shown) provided individually in the electronic mail monitoring apparatus 100 and the transmission mail server 210. Then, by virtue of the control by the CPU, similar processing to that described above is achieved. Here, the CPU operates as a computer for executing the program read from the recording medium on which the program is recorded.

A part or all of the embodiments given above may be described as the following additional descriptions. However, the present invention is not limited to these.

(Additional description 1) An electronic mail monitoring apparatus including:

an acquisition section for acquiring electronic mails transmitted from communication terminals;

an extraction section for, from the electronic mail acquired by the acquisition section, extracting user identification information indicating a user having transmitted the electronic mail and communication terminal identification information imparted to the communication terminal having transmitted the electronic mail;

a calculation section for, for each user identification information extracted by the extraction section within a unit time, calculating a uniqueness number of the communication terminal identification information;

a verification section for judging whether the uniqueness number of communication terminal identification information for each of the user identification information calculated by the calculation section has exceeded a predetermined first threshold; and a notification section for, when the verification section has judged that the uniqueness number of communication terminal identification information for each of the user identification information calculated by the calculation section has exceeded the first threshold, performing predetermined first notification to a notification destination set up in advance.

(Additional description 2) The electronic mail monitoring apparatus according to additional description 1, wherein:

when the verification section has judged that the uniqueness number of communication terminal identification information for each of the user identification information calculated by the calculation section has exceeded the first threshold, the calculation section calculates a uniqueness number of countries or regions on the basis of the communication terminal identification information for each user identification information extracted by the extraction section within a unit time;

the verification section judges whether the uniqueness number of countries or regions for each of the user identification information calculated by the calculation section has exceeded a predetermined second threshold; and the notification section does not perform the first notification and, when the verification section has judged that the uniqueness number of countries or regions for each of the user identification information calculated by the calculation section has exceeded the second threshold, performs predetermined second notification to the notification destination.

(Additional description 3) The electronic mail monitoring apparatus according to additional description 2, including a transmission control section for stopping transmission of electronic mails having a transmission source equal to the user identification information whose uniqueness number of the communication terminal identification information has been judged by the verification section as having exceeded the first threshold or, alternatively, equal to the user identification information whose uniqueness number of countries or regions has been judged by the verification section as having exceeded the second threshold.

(Additional description 4) The electronic mail monitoring apparatus according to additional description 2 or 3, wherein:

the acquisition section acquires member identification information of the user having transmitted the electronic mail, from a transmission mail server connected to the electronic mail monitoring apparatus; and the calculation section calculates the uniqueness number of communication terminal identification information or, alternatively, the uniqueness number of countries or regions, for each of the member identification information.

(Additional description 5) An electronic mail monitoring apparatus including:

an acquisition section for acquiring electronic mails transmitted from communication terminals;

an extraction section for, from the electronic mail acquired by the acquisition section, extracting user identification information indicating a user having transmitted the electronic mail and communication terminal identification information imparted to the communication terminal having transmitted the electronic mail;

a calculation section for calculating a uniqueness number of countries or regions corresponding to the communication terminal identification information for each user identification information extracted by the extraction section within a unit time;

a verification section for judging whether the uniqueness number of countries or regions for each of the user identification information calculated by the calculation section has exceeded a predetermined second threshold; and a notification section for, when the verification section has judged that the uniqueness number of countries or regions for each of the user identification information calculated by the calculation section has exceeded the second threshold, performing predetermined second notification to a notification destination set up in advance.

(Additional description 6) The electronic mail monitoring apparatus according to any one of additional descriptions 1 to 5, wherein the extraction section extracts an electronic mail address or member identification information as the user identification information and extracts an IP address as the communication terminal identification information.

(Additional description 7) A transmission mail server including:

an authentication section for authenticating a user;

a storage section for storing authentication information used for the authentication;

an acquisition section for, when the authentication section has succeeded in authentication of the user by using the authentication information stored in the storage section, acquiring electronic mails transmitted from communication terminals;

an extraction section for extracting user identification information indicating the user having transmitted the electronic mail, from the authentication information and then extracting communication terminal identification information imparted to the communication terminal having transmitted the electronic mail, from the electronic mail acquired by the acquisition section or connection processing with the communication terminal;

a calculation section for, for each user identification information extracted by the extraction section within a unit time, calculating a uniqueness number of the communication terminal identification information;

a verification section for judging whether the uniqueness number of communication terminal identification information for each of the user identification information calculated by the calculation section has exceeded a predetermined first threshold; and a notification section for, when the verification section has judged that the uniqueness number of communication terminal identification information for each of the user identification information calculated by the calculation section has exceeded the first threshold, performing predetermined first notification to a notification destination set up in advance.

(Additional description 8) A transmission mail server including:

an authentication section for authenticating a user;

a storage section for storing authentication information used for the authentication;

an acquisition section for, when the authentication section has succeeded in authentication of the user by using the authentication information stored in the storage section, acquiring electronic mails transmitted from communication terminals;

an extraction section for extracting user identification information indicating the user having transmitted the electronic mail, from the authentication information and then extracting communication terminal identification information imparted to the communication terminal having transmitted the electronic mail, from the electronic mail acquired by the acquisition section or connection processing with the communication terminal;

a calculation section for calculating a uniqueness number of countries or regions corresponding to the communication terminal identification information for each user identification information extracted by the extraction section within a unit time;

a verification section for judging whether the uniqueness number of countries or regions for each of the user identification information calculated by the calculation section has exceeded a predetermined second threshold; and a notification section for, when the verification section has judged that the uniqueness number of countries or regions for each of the user identification information calculated by the calculation section has exceeded the second threshold, performing predetermined second notification to a notification destination set up in advance.

(Additional description 9) An electronic mail monitoring method of monitoring electronic mails transmitted from communication terminals, performing:

the processing of acquiring electronic mails transmitted from the communication terminals;

the processing of, from the acquired electronic mail, extracting user identification information indicating a user having transmitted the electronic mail and communication terminal identification information imparted to the communication terminal having transmitted the electronic mail;

the processing of, for each of the user identification information extracted within a unit time, calculating a uniqueness number of the communication terminal identification information;

the processing of judging whether the uniqueness number of communication terminal identification information for each of the calculated user identification information has exceeded a predetermined first threshold; and the processing of, when it has been judged that the uniqueness number of communication terminal identification information for each of the calculated user identification information has exceeded the first threshold, performing predetermined first notification to a notification destination set up in advance.

(Additional description 10) An electronic mail monitoring method of monitoring electronic mails transmitted from communication terminals, performing:

the processing of acquiring electronic mails transmitted from the communication terminals;

the processing of, from the acquired electronic mail, extracting user identification information indicating a user having transmitted the electronic mail and communication terminal identification information imparted to the communication terminal having transmitted the electronic mail;

the processing of calculating a uniqueness number of countries or regions corresponding to the communication terminal identification information for each user identification information extracted within a unit time;

the processing of judging whether the uniqueness number of countries or regions for each of the calculated user identification information has exceeded a predetermined second threshold; and the processing of, when it has been judged that the uniqueness number of countries or regions for each of the calculated user identification information has exceeded the second threshold, performing predetermined second notification to a notification destination set up in advance.

(Additional description 11) A program for causing a computer to execute:

the procedure of acquiring electronic mails transmitted from communication terminals;

the procedure of, from the acquired electronic mail, extracting user identification information indicating a user having transmitted the electronic mail and communication terminal identification information imparted to the communication terminal having transmitted the electronic mail;

the procedure of, for each of the user identification information extracted within a unit time, calculating a uniqueness number of the communication terminal identification information;

the procedure of judging whether the uniqueness number of communication terminal identification information for each of the calculated user identification information has exceeded a predetermined first threshold; and the procedure of, when it has been judged that the uniqueness number of communication terminal identification information for each of the calculated user identification information has exceeded the first threshold, performing predetermined first notification to a notification destination set up in advance.

(Additional description 12) A program for causing a computer to execute:

the procedure of acquiring electronic mails transmitted from communication terminals;

the procedure of, from the acquired electronic mail, extracting user identification information indicating a user having transmitted the electronic mail and communication terminal identification information imparted to the communication terminal having transmitted the electronic mail;

the procedure of calculating a uniqueness number of countries or regions corresponding to the communication terminal identification information for each user identification information extracted within a unit time;

the procedure of judging whether the uniqueness number of countries or regions for each of the calculated user identification information has exceeded a predetermined second threshold; and the procedure of, when it has been judged that the uniqueness number of countries or regions for each of the calculated user identification information has exceeded the second threshold, performing predetermined second notification to a notification destination set up in advance.

The present invention has been described above with reference to the embodiments. However, the present invention is not limited to the embodiments given above. Various changes which can be understood by the person skilled in the art within the scope of the present invention may be made on the configurations and the details of the present invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

That which is claimed is:

1. An electronic mail monitoring apparatus comprising:
   a memory that stores a program describing processing details as a plurality of steps; and
   a CPU that reads the program from the memory and executes a plurality of processing based on each of the plurality of steps; and
   wherein the plurality of processing comprises:
      an acquisition processing for acquiring electronic mail transmitted from a plurality of communication terminals;
      an extraction processing for extracting user identification information indicating a user having transmitted the electronic mail and communication terminal identification information imparted to a communication terminal of the plurality of communication terminals having transmitted the electronic mail from the electronic mail acquired by the acquisition processing;
      a calculation processing for calculating a uniqueness number of the communication terminal identification information for each user identification information extracted by the extraction processing within a unit time;
      a verification processing for judging whether the uniqueness number has exceeded a predetermined first threshold; and
      a notification processing for performing predetermined notification to a notification destination set up in advance;
   wherein: when the verification processing has judged that the uniqueness number has exceeded the first threshold, the calculation processing calculates a uniqueness number of countries or regions on the basis of the communication terminal identification information for each user identification information extracted by the extraction processing within a unit time;
   the verification processing judges whether the uniqueness number of countries or regions has exceeded a predetermined second threshold; and
   the notification processing does not perform the first notification and, when the verification processing has judged that the uniqueness number of countries or regions has exceeded the second threshold, performs the predetermined second notification to the notification destination.

2. The electronic mail monitoring apparatus according to claim 1, comprising:
   a transmission control processing for stopping transmission of electronic mail having a transmission source equal to the user identification information whose uniqueness number of the communication terminal identification information has been judged by the verification processing as having exceeded the first threshold or, alternatively, equal to the user identification information whose uniqueness number of countries or regions has been judged by the verification processing as having exceeded the second threshold.

3. The electronic mail monitoring apparatus according to claim 1, wherein the acquisition processing acquires member identification information of the user having transmitted the electronic mail from a transmission mail server connected to the electronic mail monitoring apparatus; and
   the calculation processing calculates the uniqueness number of communication terminal identification information or, alternatively, the uniqueness number of countries or regions, for each of the member identification information.

4. The electronic mail monitoring apparatus according to claim 1, wherein the extraction processing extracts an electronic mail address or member identification information as the user identification information and extracts an IP address as the communication terminal identification information.

5. A transmission mail server comprising:
   a memory that stores a program describing processing details as a plurality of steps; and
   a CPU that reads the program from the memory and executes a plurality of processing based on each of the plurality of steps; and
   wherein the plurality of processing comprise:
      an authentication processing for authenticating a user;
      a storage processing for storing authentication information used for the authentication;
      an acquisition processing for, when the authentication processing has succeeded in authentication of the user by using the authentication information stored in the storage processing, acquiring electronic mail transmitted from a plurality of communication terminals;
      an extraction processing for extracting user identification information indicating the user having transmitted the electronic mail from the authentication information and then extracting communication terminal identification information imparted to a communication terminal of the plurality of communication terminals having transmitted the electronic mail from the electronic mail acquired by the acquisition processing or connection processing with the communication terminal;
      a calculation processing for, for each user identification information extracted by the extraction processing within a unit time, calculating a uniqueness number of the communication terminal identification information;
      a verification processing for judging whether the uniqueness number has exceeded a predetermined first threshold; and
      a notification processing for performing predetermined notification to a notification destination set up in advance;
   wherein: when the verification processing has judged that the uniqueness number has exceeded the first threshold, the calculation processing calculates a uniqueness number of countries or regions on the basis of the communication terminal identification information for each user identification information extracted by the extraction processing within a unit time;
   the verification processing judges whether the uniqueness number of countries or regions has exceeded a predetermined second threshold; and
   the notification processing does not perform the first notification and, when the verification processing has judged that the uniqueness number of countries or regions has exceeded the second threshold, performs predetermined second notification to the notification destination.

6. The electronic mail monitoring apparatus according to claim 1 wherein the calculation processing calculates the uniqueness number of communication terminal identification information from the number of IP addresses that are the same electronic mail address of relevant electronic mail, and that are mutually different; and wherein the calculation processing calculates the uniqueness number of countries or regions from the number of countries or regions which are associated with the range of IP addresses that are the same electronic mail address of relevant electronic mail, and that are mutually different.

7. The electronic mail monitoring apparatus according to claim 3 wherein the calculation processing calculates the uniqueness number of communication terminal identification information from the number of IP addresses that are the same electronic mail address of relevant electronic mail, and that are mutually different; and wherein the calculation processing calculates the uniqueness number of countries or regions from the number of countries or regions which are associated with the range of IP addresses that are the same electronic mail address of relevant electronic mail, and that are mutually different.

* * * * *